April 12, 1966     L. MACKLIN     3,245,511

APPARATUS FOR SUPPORTING ELONGATED ARTICLES

Filed July 6 1965

*INVENTOR.*
LESTER MACKLIN
BY   *V. F. Voek*

*HIS AGENT*

3,245,511
APPARATUS FOR SUPPORTING ELONGATED ARTICLES
Lester Macklin, Yonkers, N.Y., assignor to Anaconda Wire and Cable Company, a corporation of Delaware
Filed July 6, 1965, Ser. No. 469,674
11 Claims. (Cl. 193—37)

My invention relates to an apparatus for supporting elongated articles and particularly to such apparatus wherein the supporting member comprises a flexible sheet.

There are many types of industrial operations wherein it is necessary to support an elongated article such as a cable or hose while such article is advancing. This may be accomplished by a series of hooks or of rollers, the latter being used where it is necesary to reduce friction against the article being supported. In many cases, however, the supported article is so easily damaged that even soft-surfaced rollers would not offer sufficient protection if they were used as supports under the advancing article. Examples of such easily damaged articles would be pipes or cables in a semiplastic state during a cooling operation, articles having an easily scraped or abraded surface such as a glass-fiber serving, cables having a plurality of relatively fragile units such as geophones, attached along their lengths, and others that will occur to persons familiar with the applicable arts.

It has been suggested in the past to advance such delicate elongated articles along a conveyor system comprised of a series of balloon tires. Such tires, however, have to be guarded against deflation, and usually require auxiliary guides or rollers to keep the advancing article in position on the surfaces of the tires.

I have invented an apparatus that will safely support an easily damaged advancing elongated article comprising a pair of end members, means rotatably mounting the end members around a common axis, and means providing for at least one of my end members being movable along the axis of rotation. My apparatus has a flexible sheet attached to both of the members. This sheet forms a tubular supporting surface between the members, around the axis. And there are means urging the members apart along the axis so as to stretch the sheet against the weight of the advancing article.

In a preferred embodiment my apparatus comprises a shaft, means rotatably supporting the shaft, a pair of end members, such as plates, mounted on the shaft with one or both of said members being movable along the shaft. There are means such as a key and matching keyway preventing the rotation of the members relative to the shaft. This may be accomplished by having a shaft of noncircular section. There are also means such as bushings slidable on the shaft for maintaining the end members at a fixed angle to the axis of the shaft. As mentioned above, there is a flexible sheet, such as a sheet of vulcanized elastomer, attached to both of the members. This sheet forms a tubular supporting surface between the members around the shaft. There are also means, such as a compression spring, between the members urging them apart on the shaft.

A more thorough understanding of my invention can be gained from a study of the appended drawing.

Figure 1:
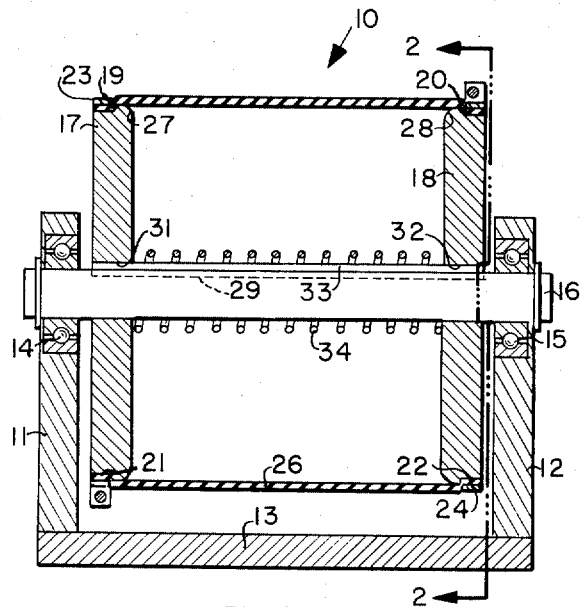
FIGURE 1 is a vertical section of the apparatus of my invention.
Figure 2:
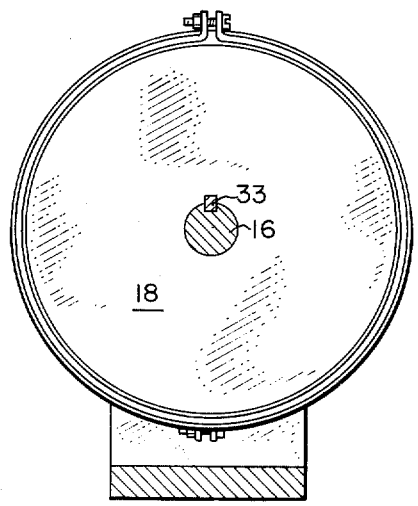
FIGURE 2 is a section through the line 2—2 of the apparatus of FIGURE 1.
Figure 3:
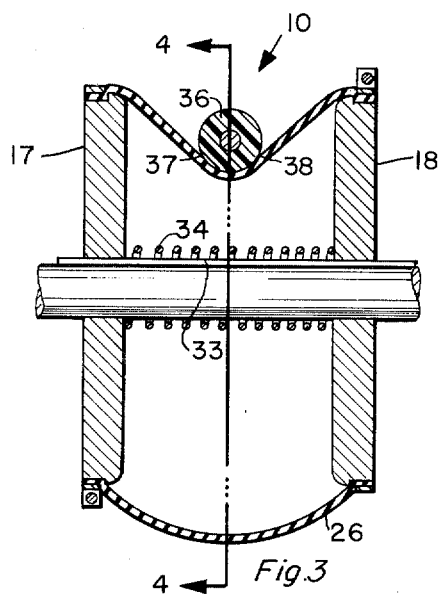
FIGURE 3 is a section of the apparatus under load.
Figure 4:
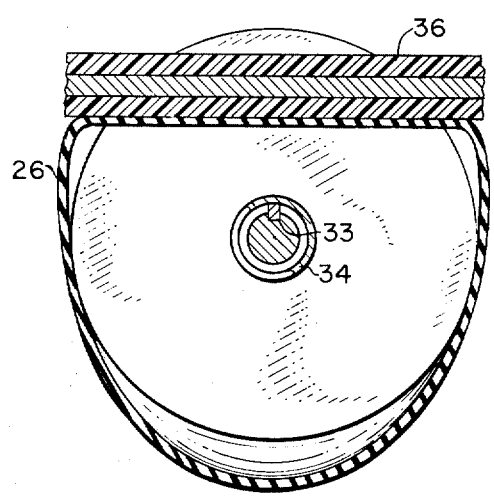
FIGURE 4 is a section through the line 4—4 of FIGURE 3.

The embodiment of my apparatus shown in the drawing is particularly suitable for supporting heavy cables emerging from a plastic extruder. Other types of mountings will have utility for other applications within the scope of my invention. The support apparatus, indicated generally by the numeral 10 has two uprights 11, 12 mounted on a base 13. The uprights 11, 12 respectively support two ball bearings 14, 15 for a shaft 16. Two aluminum plates 17, 18 are closely fitted on the shaft 16. The plates are so thick and fit so closely to the shaft that they cannot tip. Where thinner plates are used their angle with the axis of the shaft is maintained constant by means of bushings that fit closely to the shaft and are rigidly fastened to the plates. The plates 17, 18 have shoulders 19, 20 terminating relieved areas 21, 22 that correspond with hose-clamp type straps 23, 24 for firmly fastening a flexible tubular sheet 26 to the plates 17, 18. The sheet 26 is a vulcanized gum rubber for the illustrated apparatus which has, as its purpose, the support of polyethylene insulated cable as it emerges from the head of a plastic extruder. Other service may require sheet materials capable of supporting articles at higher temperature and such known materials as the vulcanized elastomers; neoprene, silicone rubber, thiokol; and even tough thermoplastic materials such as PVC, may be used within the scope of my invention, either alone or supported by suitable fibers such as cotton, polyester, glass, and others. The plates 17, 18 are rounded at their facing edges 27, 28 to minimize wear on the sheet 26 when it is depressed as shown in FIGURES 3 and 4. The shaft 16 has a keyway 29 and there are corresponding keyways 31, 32 which accommodate a key 33 locking the plates 17, 18 to the shaft and preventing them from rotating relative to each other. Relative rotation of the plates 17, 18 to each other would produce a shearing stress in the sheet 26 and would misdirect the supported article at an oblique angle to the planes of the plates. Other means than a key and keyways for preventing rotation of the plates 17, 18 on the shaft 16, included within the scope of my invention, are the use of a noncircular shaft such as a square or hexagonal shaft, set-screws, etc.

The plates 17, 18 can slide towards each other on the shaft 16 and are urged apart by a compression spring 34 around the shaft 16. The space formed by the plates 17, 18 and the sheet 26 is not air-tight since air can leak through the keyways 31, 32 and, indeed, if such leakage is too slow so as to produce a dash-pot action delaying the response of the plates to the urging of the springs, holes may be drilled through the plates 17, 18. In this regard it should be noted that although I have found it convenient to use solid aluminum blocks for my plates 17, 18, they might equally well be comprised of spoked wheels so long as a rim is provided to support the tubular sheet 26 and means, such as a thick hub, are provided to prevent them from tipping in the line of the shaft axis.

Both of my plates 17, 18 are slidable along the shaft 16. This allows for the centering of the article being supported. Where such centering is not important it is conceivable within the scope of my invention that one of the plates, such as the plate 17 or an equivalent member, might be fixed while all the motion against the spring 34 is accomplished by the plate 18.

When an article, such as a cable 36, is being supported by my apparatus 10 (FIGURES 3 and 4) the plates move together, compressing the spring 34. In so doing they increase the area of support not only circumferentially as the sheet 26 folds around the cable to points 37, 38 but also longitudinally as can best be seen in FIGURE 4.

The above description of my apparatus is exemplary rather than definitive and other embodiments coming within the scope of my invention are defined in the appended claims.

I claim:
1. An apparatus for advancingly supporting an elongated article comprising:
(A) a pair of end members,
(B) means rotatably mounting said members around a common axis,
(C) means providing for at least one of said members being movable along said axis,
(D) a flexible sheet
  (a) attached to both of said members,
  (b) forming a tubular supporting surface between said members
  (c) around said axis, and
(E) means urging said members apart along said axis.

2. An apparatus for advancingly supporting an elongated article comprising:
(A) a shaft,
(B) means rotatably supporting said shaft,
(C) a pair of end members mounted on said shaft,
(D) at least one of said members being movable along said shaft,
(E) means preventing the rotation of said members relative to said shaft,
(F) a flexible sheet
  (a) attached to both of said members,
  (b) forming a tubular supporting surface between said members
  (c) around said shaft, and
(G) means urging said members apart on said shaft.

3. The apparatus of claim 2 wherein said sheet is a vulcanized elastomer.

4. The apparatus of claim 2 wherein said urging means comprises a compression spring between said members.

5. An apparatus for advancingly supporting an elongated article comprising:
(A) a shaft,
(B) means rotatably supporting said shaft,
(C) a pair of end plates mounted on said shaft,
(D) said plates being movable along said shaft,
(E) means preventing the rotation of said plates relative to said shaft,
(F) a flexible sheet
  (a) attached to both of said plates,
  (b) forming a tubular supporting surface between said plates
  (c) around said shaft, and
(G) means urging said plates apart on said shaft.

6. The apparatus of claim 5 wherein said sheet is a vulcanized elastomer.

7. The apparatus of claim 5 wherein said urging means comprises a compression spring between said plates.

8. The apparatus of claim 5 wherein said rotation prevention means comprises a key and matching keyway.

9. An apparatus for advancingly supporting an elongated article comprising:
(A) a shaft having noncircular cross section,
(B) means rotatably supporting said shaft,
(C) a pair of end plates mounted on said shaft, said end plates being prevented from rotating relative to said shaft by virtue of the noncircular section of said shaft,
(D) said plates being movable along said shaft,
(E) a flexible sheet
  (a) attached to both of said plates,
  (b) forming a tubular supporting surface between said plates
  (c) around said shaft, and
(F) means urging said plates apart on said shaft.

10. The apparatus of claim 9 wherein said sheet is a vulcanized elastomer.

11. The apparatus of claim 9 wherein said urging means comprises a compression spring between said plates.

References Cited by the Examiner
UNITED STATES PATENTS

| | | | |
|---|---|---|---|
| 2,651,398 | 9/1953 | McGraw | 193—37 |
| 2,862,250 | 12/1958 | Fusaroli | 29—113 X |
| 3,091,132 | 5/1963 | Mayfield et al. | 74—230.16 X |
| 3,098,284 | 7/1963 | Hornbostel | 29—113 |

EVON C. BLUNK, Primary Examiner.

A. LEVINE, Assistant Examiner.